United States Patent
Sanz Pascual et al.

(10) Patent No.: US 8,961,842 B2
(45) Date of Patent: Feb. 24, 2015

(54) DEVICE FOR REGULATING DEFORMATIONS OF THE BED OF A GEOMETRICALLY AERODYNAMIC MOLD AND MOLDING METHOD WITH THIS DEVICE

(75) Inventors: Eneko Sanz Pascual, Sarriguren (ES); Raquel Pagola Divasson, Sarriguren (ES); Javier Iriarte Eleta, Sarriguren (ES); Juan Jose Fuertes Thomas, Sarriguren (ES); Jon Arocena De La Rua, Sarriguren (ES)

(73) Assignee: Gamesa Innovation & Technology, S.L., Sarriguren (Navarra) (ES)

( * ) Notice: Subject to any disclaimer, the term of this patent is extended or adjusted under 35 U.S.C. 154(b) by 246 days.

(21) Appl. No.: 13/307,489

(22) Filed: Nov. 30, 2011

(65) Prior Publication Data

US 2012/0133066 A1 May 31, 2012

(30) Foreign Application Priority Data

Nov. 30, 2010 (ES) .................................. 201001526

(51) Int. Cl.
*B29C 33/42* (2006.01)
*B29C 33/30* (2006.01)
*B29C 33/00* (2006.01)

(52) U.S. Cl.
CPC ........... *B29C 33/308* (2013.01); *B29C 33/0011* (2013.01)
USPC ....... 264/40.1; 425/555; 425/141; 425/192 R; 249/82; 249/155

(58) Field of Classification Search
CPC .. B29C 33/0011; B29C 33/308; B29C 33/42; B28B 7/02; B28B 7/04
USPC ........ 425/555, 141, 192 R, 150; 249/82, 155; 264/40.1
See application file for complete search history.

(56) References Cited

U.S. PATENT DOCUMENTS

| | | | | |
|---|---|---|---|---|
| 2,227,966 A * | 1/1941 | Emsley | ........................... | 249/68 |
| 3,587,135 A * | 6/1971 | Herzhoff | ........................ | 425/157 |
| 3,618,886 A * | 11/1971 | Graham | ........................ | 249/13 |
| 3,881,856 A * | 5/1975 | Fougea | ........................ | 425/432 |
| 3,933,962 A * | 1/1976 | Meier | ........................... | 264/134 |
| 4,309,824 A * | 1/1982 | Fuchs | ............................ | 33/549 |
| 4,695,032 A * | 9/1987 | Desport | ....................... | 249/112 |
| 4,781,562 A * | 11/1988 | Sano et al. | .................... | 425/141 |
| 4,824,617 A * | 4/1989 | Takeuchi et al. | .............. | 264/419 |
| 5,151,277 A * | 9/1992 | Bernardon et al. | ........... | 425/112 |
| 5,372,349 A * | 12/1994 | Elmore | ......................... | 249/112 |
| 5,492,303 A * | 2/1996 | Jaruzel | ............................. | 249/4 |
| 5,622,730 A * | 4/1997 | Nitta et al. | .................... | 425/141 |
| 6,354,561 B1 * | 3/2002 | Fahrion | ........................ | 249/155 |
| 7,048,529 B2 * | 5/2006 | Morandi | ........................ | 425/193 |
| 2003/0091679 A1 * | 5/2003 | Aramburu et al. | ............. | 425/384 |
| 2004/0188054 A1 * | 9/2004 | Thibault et al. | ............... | 164/316 |
| 2005/0029714 A1 * | 2/2005 | Miyanaga et al. | ............. | 264/573 |
| 2006/0096528 A1 * | 5/2006 | Kawatake et al. | ............. | 118/407 |
| 2008/0302500 A1 * | 12/2008 | Winkler | .......................... | 164/45 |

\* cited by examiner

*Primary Examiner* — Joseph S Del Sole
*Assistant Examiner* — Nahida Sultana
(74) *Attorney, Agent, or Firm* — Ladas & Parry LLP

(57) ABSTRACT

The invention describes a regulating device that adapts to the aerodynamic profile of a mold bed made of composite material offsetting the geometrical deviations occurring in the mold bed. The device comprises some stiffening ribs (20) supported on a surface of the bed (10) of the mold and is equipped with actuators (21) that modify the curvature of the bed (10) of the mold.

10 Claims, 4 Drawing Sheets

DEVICE FOR REGULATING DEFORMATIONS OF THE BED OF A GEOMETRICALLY AERODYNAMIC MOLD AND MOLDING METHOD WITH THIS DEVICE

OBJECT OF THE INVENTION

The present invention is related with the production of composite material pieces made with molds also of composite materials and, in particular, with a regulating device that allows correction of deformations that occur following a curing cycle in the bed of a mold made of composite material, minimizing profile errors of the product obtained from the mold. Likewise, the invention is related with the method of molding pieces with the regulating device of the invention.

BACKGROUND OF THE INVENTION

During manufacturing of a mold made of composite material, the material undergoes a pre-curing and a final post-curing, both constituting a high temperature thermal cycle permitting the polymerization of the resin and thus attaining the mechanical properties required in the mold.

Later, during production of pieces made of composite material with this mold, it is common to undergo phenomena derived from expansion and contraction of the material, namely Spring-back (recovery of material elasticity) and Chemical Shrinkage (increase of the density of the material during the curing process).

These effects provoked by thermal cycles result in permanent geometrical deformations in the bed of the molds that will later be transmitted to the products made in the mold.

These effects intensify as the surface and geometrical complexity of the molds increase (double curvature and sharp angles).

The lack of repetitiveness in the behavior of pieces of large dimensions makes the correction of these deformations using a geometric factor applicable to the geometry of the model for which the mold is obtained unfeasible. Thus, these effects need to be mitigated by other means, whose objective is to keep the model of the mold from altering the geometry of the manufactured piece on the mold itself.

Some of these solutions are based on laminating the bed of the mold using a lamination made of fiberglass fabrics interwoven and pre-impregnated with a low content of resin and following a balanced lamination sequence (in % of fiber) and symmetrical in the orientation of the fibers. Likewise, in order to reduce these deformations, the molds are manufactured on models having the same or similar coefficient of thermal expansion (CTE). Notwithstanding the above, these solutions failed to eradicate all the cited deviations.

In this respect, Spanish patent ES2208028, held by the same applicant of the present invention, is known to address this issue and describes the production of a mold of wind turbine blade shells comprising two parts, upper and lower, joined together by a pivoting mechanism that permits attainment of all positions necessary to manufacture a blade. Each part of the mold, semi-mold, comprises a bed or cradle of composite material resting on a structure braced against some ribs distributed along the bed.

The bed is the part that gives the final product its aerodynamic geometry, likewise serving as a base for its production. In the cited Patent, this bed is formed by a sandwich structure with skins of composite material (pre-impregnated) and an aluminum honeycomb core that acts as a thermal chamber by the introduction of hot air through some conduits situated along the bed.

The conduits are coupled to the surface of the bed by some ribs that, by some runners secured to a pivoting system and some hinges on the legs of the mold structure, are designed to absorb the deviations of the mold.

However, once the aforementioned deformations have occurred in the bed, they cannot be corrected with the ribs mentioned in the patent and the deformations could end up exceeding the mold bed's required surface tolerances and hence the final product obtained.

Other solutions in the State of the art are known to attempt to solve the deformations in the mold bed, particularly international patent WO2010103493, which describes a mold solution incorporating a longitudinally-laminated tube together with some actuators fitted in various sections perpendicular to the mold surface. These sections are in turn reinforced by a rib that joins the different actuators in a single section. Nonetheless, this solution obtains an elevated longitudinal rigidity and little cross rigidity, thus the adjustment or correction of the mold section is carried out lengthwise. On the other hand, this solution is not equipped with an expansion system and therefore not only fails to solve the aforementioned problems but also applies solely to low-temperature molds for infusion mold blades.

DESCRIPTION OF THE INVENTION

The present invention is related with a regulating device that adapts to the aerodynamic profile of a composite material mold bed that offsets the geometrical deviations originating therein.

An object of the invention is to integrate the regulating device and the stiffening ribs of the composite material mold into a single element.

Another object of the invention lies in having each regulating device act on the crosswise rigidity of the rib so as to transmit loads by the rib curving the section of the mold bed according to a defined strategy.

Another object of the invention is that each regulating device comprises various manually activated application points, and the number of application points shall increase as the width of the mold increases, consequently permitting coverage spanning the entire surface of the transverse section of the mold bed.

Another object of the invention is that the ribs determine some openings for integrating the application points, which apply forces tangentially to the surface of the bed and modify the curvature of the rib itself and, consequently, the curvature of the section of the mold bed.

Another object of the invention is to have the ribs under this invention acting as hinges on the mold bed.

Another object of the invention is a method that, for the layout of the stiffening ribs, factors in not only the stability of the bed itself, but also the extent of actuation of the rib regulating system with a view to reducing the overall number of actuators per mold section.

Another object of the invention is a molding method for a piece in which the ribs act as a rigid and permanent structural element after having corrected the deformations in the mold bed and secured the regulating system.

These and other aspects of the invention shall be described in further detail with the aid of the drawings, which are described below.

DESCRIPTION OF A PREFERENTIAL EMBODIMENT

Production of wind turbine blades utilizes shell molds formed by two semi-molds, upper and lower, joined together by a pivoting mechanism that makes any necessary position in blade production possible. Each semi-mold comprises a bed (1) made of composite material and is set on a structure braced (3) to some ribs (2) distributed along the bed (1). The ribs (2) lend transversal rigidity to the bed (1), rendering it geometrically stable and allowing the introduction of conduits (not represented) inside the mold, through which air introduced into the bed (1) circulates along the aerodynamic profile of the blade.

Figure 1:
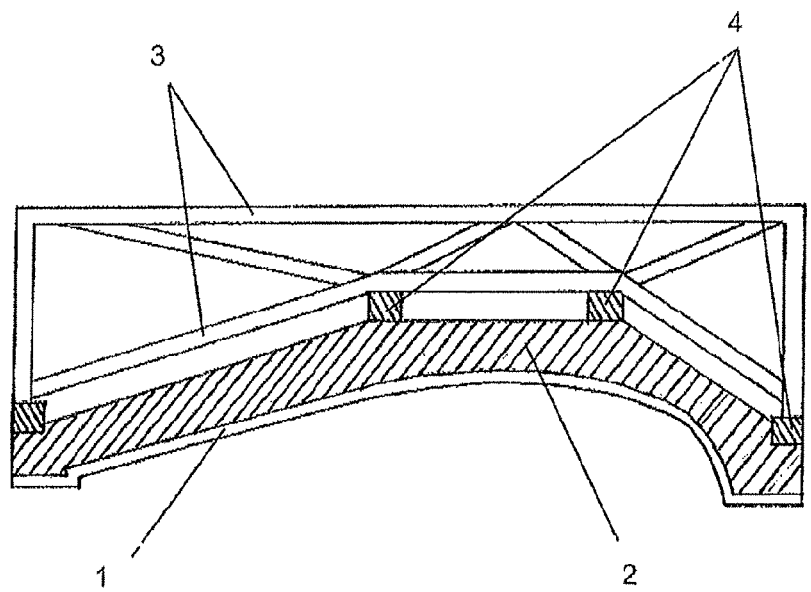
FIG. 1 shows a cross section diagram of a shell mold equipped with a conventional rib.

FIG. 1 shows a conventional stiffening rib (2) that follows the geometry of the composite material bed (1) of a semi-mold and is joined to it by an adhesive union and humid lamination. Metal framework (3) is supported on this conventional rib (2) and joined by some slides (4).

However, the rigidity provided by conventional stiffening ribs (2) does not suffice to prevent geometrical deformations that, due to the phenomena derived from expansion and contraction of the materials, appear in the bed (1) of the mold and consequently transfer to the blade produced on the bed (1).

Figure 5:
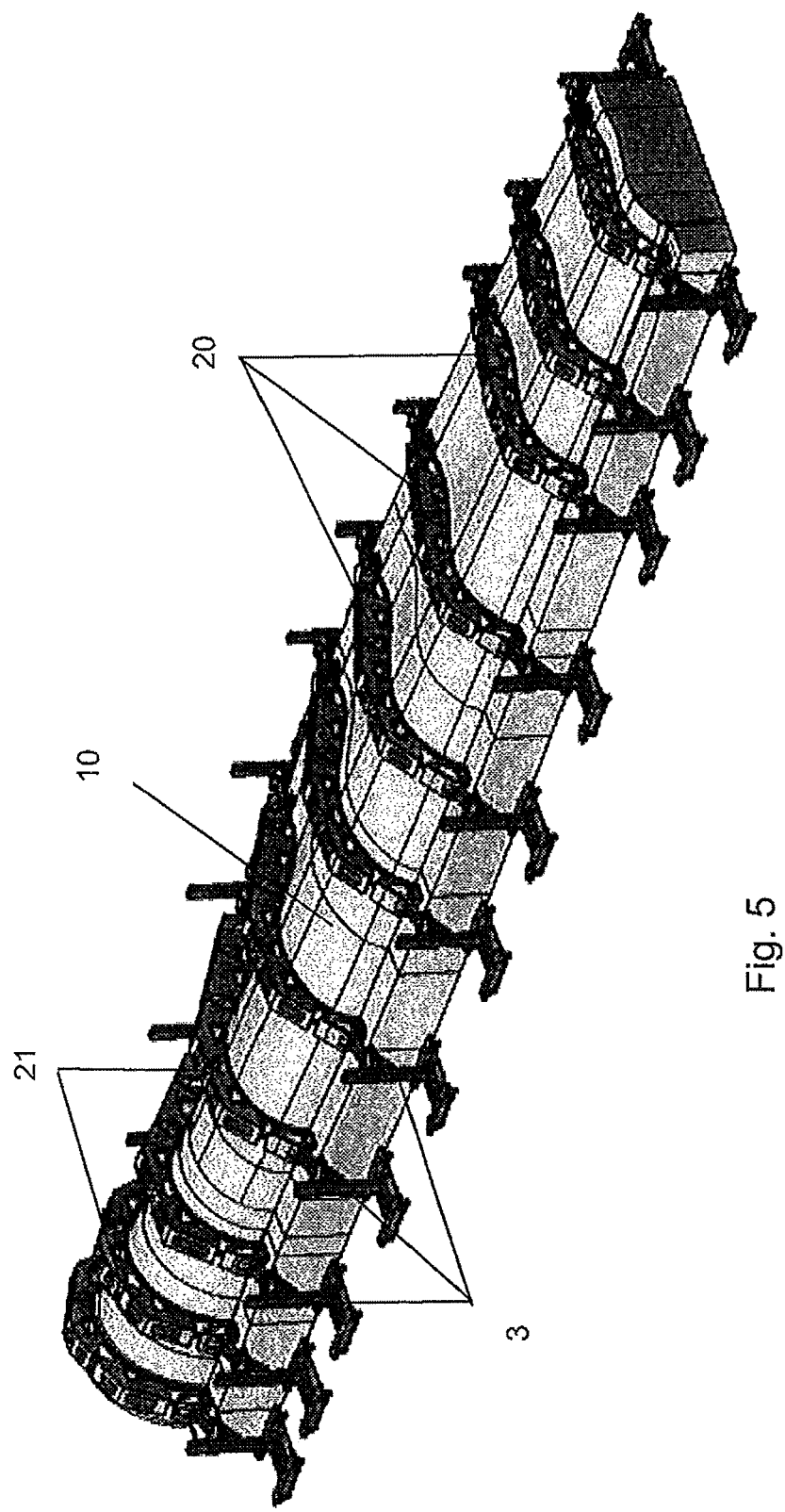
FIG. 5 shows a perspective view of the rib placement process according to the invention.

The present invention comprises a regulating system that determines the distribution of a series of metallic ribs (20) along and fully supported on the surface of the bed of the semi-mold where these are laminated or adhered, and integrate some actuators (21), which permits correction or minimization of geometrical deviations originating in the bed (10) of the semi-mold (see FIG. 5).

Figure 3:
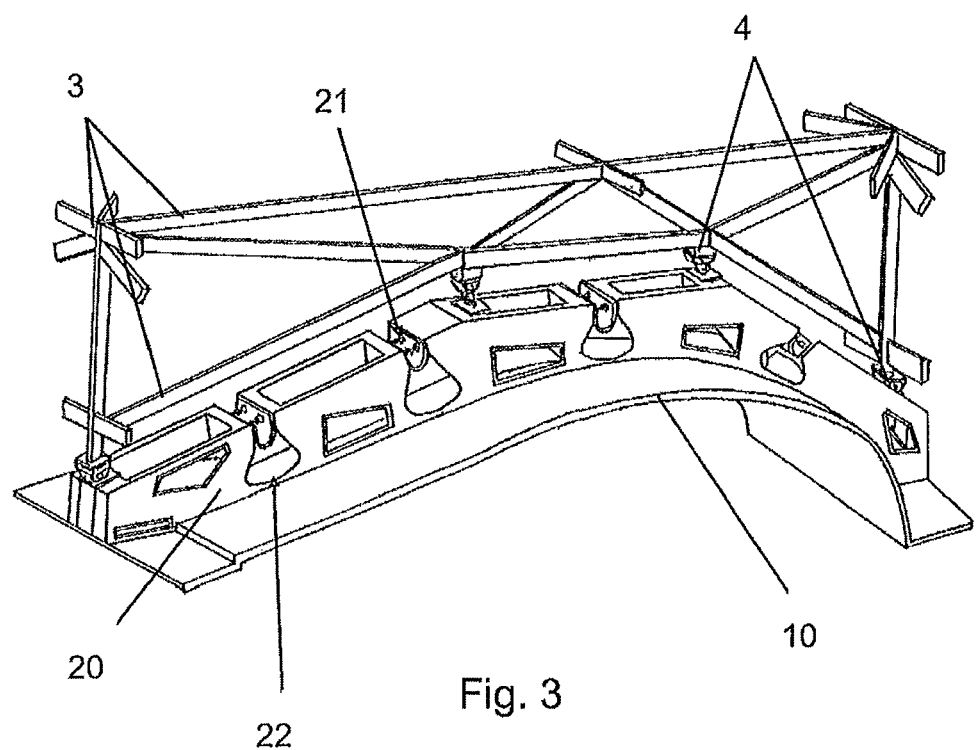
FIG. 3 shows a diagram view of the regulating system according to the invention.

Each rib (20) comprises various actuators (21) that are manually activated and integrated in some divisions of the ribs (20) allowing profile modification of the bed (10) of the semi-mold by a change in curvature (see FIG. 3).

To do so, the number of actuation elements (21) intended for incorporation shall be contingent on the aerodynamic profile of the mold. In other words, as the mold becomes wider, a greater the number of actuators (21) should be fitted.

Figure 2:
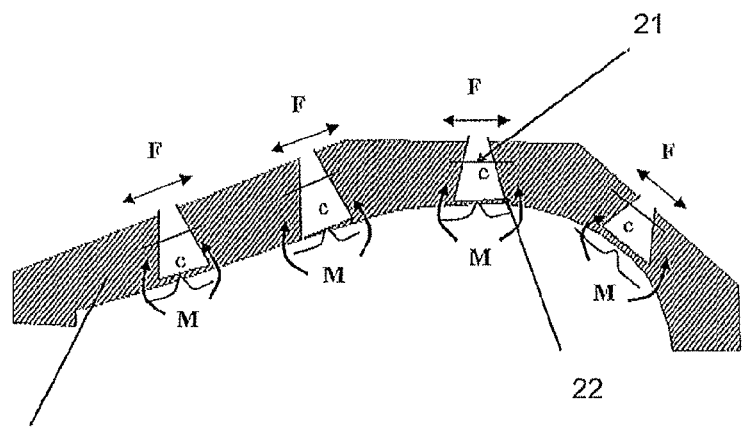
FIG. 2 is a diagram drawing of a rib fitted with a regulating system as per the invention.

As shown in FIG. 2, each actuator (21) generates a force (F) among the various parts of the ribs (20) into which it is integrated. This applied force (F) is appropriate in a moment (M) at the point where the rib (20) joins the bed (10). The actuator (21) generates a curvature (c) in the bed (10) that is proportional to the moment (M) applied.

In order to have variation of the curvature (c) remain gradual and to keep it from being reflected in the bed (10) of the profile, the trimming (22) made in the rib (20) follows a curvature that permits the control of the curvature of the rib (20) and the weakening controlled in the section of the ribs (20) act as hinges.

Figure 4A:
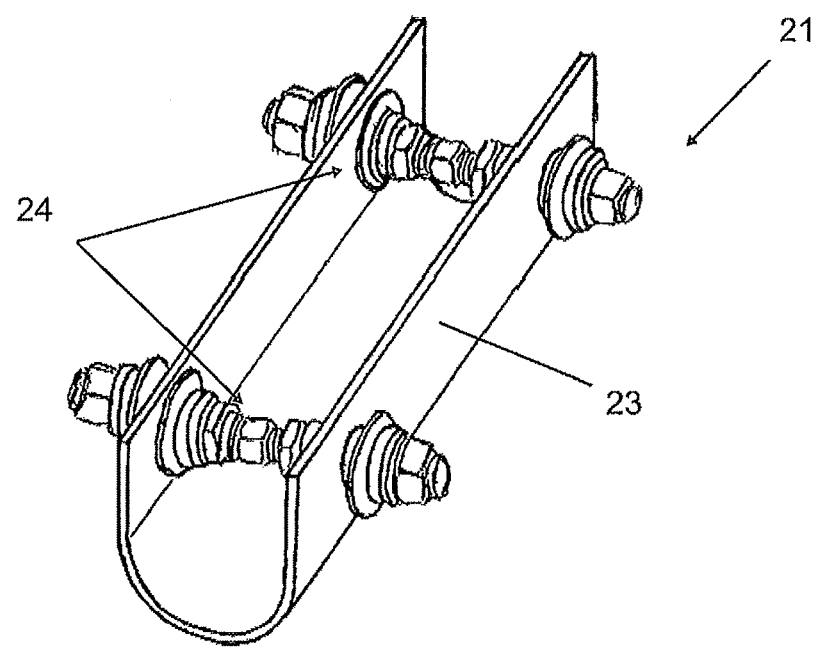
FIGS. 4A and 4B show perspective views of the regulating system actuator according to the invention.
Figure 4B:
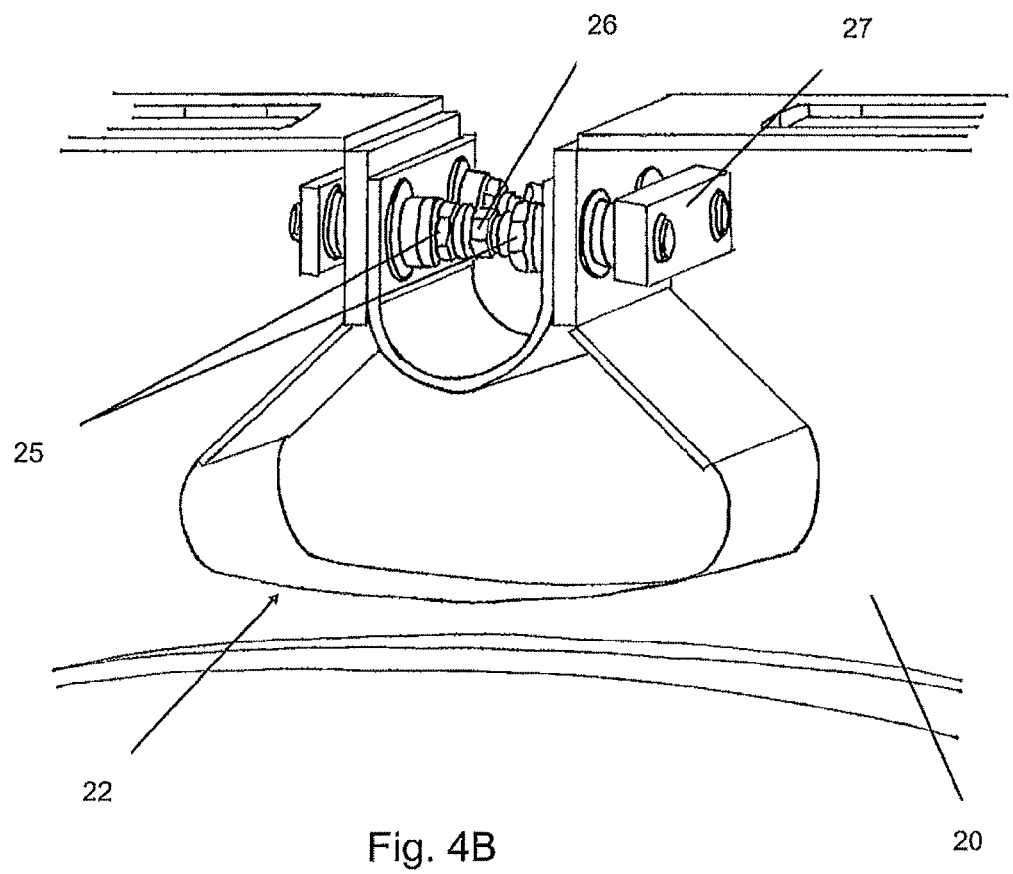

The actuator (21), as shown in FIGS. 4A and 4B, is a tensor type and is formed by a U-shaped connection (23) which transmits stresses between the cut-out points (22) on the rib (20).

In the present embodiment, the actuator (21) has two bolts (24) with threaded actuation to the right and left for enhanced control over the curvature (c) of the rib (20), inserted in some orifices made in the cut-out points (22) of the rib (20) and secured using external locking elements (27) as well as washers to permit inclination of the walls of the rib (20). Each of the bolts (24) have some locking nuts (25) and a actuation point (26) to separate the external locking elements (27) to a desired distance depending on the insertion of the actuation bolt (24).

The invention likewise comprises a molding method integrating the incorporation of a regulating system consisting of the following steps:
placing ribs (20) fitted with actuators (21) along the entire bed of the semi-mold perpendicular to the bed section (10) of the semi-mold with the actuators tensed, thus providing rigidity to the unit
affixing or laminating the ribs on the bed of the mold and continuing the process of remanufacturing of the mold
having concluded post-curing of the mold, measuring its surface to ascertain deviations on the bed (10)
driving the actuators (21) on each rib (20), carrying out opening or closing motions to correct deformations or deviations detected in the bed (10)
molding the blade itself The measurement of deviations in the bed (10) is made by conventional methods, such as a Laser tracker, scanning the sections of the mold along the entire length of its surface, and the best fit method to ascertain existing deviations.

While the present invention has been described entirely in connection with the preferred embodiments, it is obvious that modifications can be made within this scope, which shall not be construed to limit the previous embodiments, rather for the content of the following claims.

The invention claimed is:

1. A device comprising a mold having two semi-molds, wherein at least a first of the semi-molds comprises (a) a bed having a surface and an aerodynamic profile, wherein the bed is made of a composite material that has been subjected to a curing process that can lead to a deviation in the aerodynamic profile of the bed; and (b) a plurality of stiffening ribs disposed along the surface of the bed, wherein at least one of the plurality of stiffening ribs comprises an elongate body secured to the surface of the bed and having at least one actuator capable of being actuated to generate a force, the at least one actuator being disposed at a position within the elongate body such that the force generated by the actuator when actuated is capable of causing the at least one stiffening rib to impact the surface so as to modify the aerodynamic profile of the bed and correct the deviation in the aerodynamic profile.

2. The device according to claim 1, wherein each of the plurality of stiffening ribs is disposed perpendicular to a length of the bed and is joined by adhesion or lamination to the surface of the bed.

3. The device according to claim 1, wherein each of the plurality of stiffening ribs comprises (i) an elongate body having at least one opening within the elongate body and (ii) at least one actuator within the at least one opening.

4. The device according to claim 1, wherein the at least one actuator of each of the plurality of stiffening ribs is manually activatable.

5. The device according to claim 1, wherein the at least one actuator, when actuated, generates a force (F) within the at least one stiffening rib that causes a moment of force (M) to be applied at a place where the at least one stiffening rib is secured to the surface of the bed to generate a curvature (c) in the bed that is proportional to the moment of force (M) applied.

6. The device according to claim 1, wherein the at least one stiffening rib comprises an elongate body with a plurality of openings with an actuator in each of the plurality of openings, and wherein each of the actuators comprises a U-shaped member that transfers stresses among the plurality of openings.

7. The device according to claim 6, wherein each actuator has a plurality of actuation bolts comprising threading for controlling a curvature of the at least one stiffening rib and washers that permit inclination of walls of the at least one stiffening rib.

8. The device according to claim 7, wherein each of the plurality of actuation bolts is disposed in an orifice in one of the plurality of openings and secured with a plurality of locking elements.

9. The device according to claim 7, wherein each of the plurality of actuation bolts comprises means for separating respective legs of the U-shaped member from each other to a desired distance.

10. The device according to claim 1, wherein each of the plurality of stiffening ribs comprises a metal material.

* * * * *